United States Patent Office 2,965,565
Patented Dec. 20, 1960

2,965,565

POLYMERIZATION INHIBITOR

David W. McDonald, Texas City, Tex., assignor to Monsanto Chemical Company, St. Louis, Mo., a corporation of Delaware No Drawing. Filed May 8, 1958, Ser. No. 733,830

8 Claims. (Cl. 252—1)

This invention relates to the inhibition of polymerization. In one embodiment, it pertains to the inhibition of undesirable polymer growth in processing equipment. Specifically, it is concerned with a method for the stabilization of diacetylene or of mixtures containing diacetylene against polymerization and the stabilized compositions so produced.

If acetylene is produced from hydrocarbons, e.g., by the well known electric arc process or by thermal decomposition or dissociation, the acetylene-containing gas mixture produced generally contains diacetylene as well, in amounts ranging from as little as 0.05% to as much as 5%. The purification of such an acetylenic gas mixture is usually accomplished by the selective action of suitable solvents. A great number and variety of solvents have been proposed and are effectively employed in well-developed purification processes. However, in these conventional methods of absorption and stripping, the gas mixture is exposed to conditions of temperature and pressure under which some of the diacetylene present polymerizes, and provision must be made in all such processes for periodic removal of the diacetylene polymers to prevent their excessive build-up in the solvent in the absorption step. This requires additional, specialized filtration equipment as well as added process steps which are costly with regard to both time and capital expense. Frequently, too, the diacetylene polymer collects in the less accessible parts of the system, fouling up equipment lines, columns, and the like. Usually, this particular polymer is of such a small particle size that it plugs the filter used for separating it, so that only a small amount can be filtered in each operation and an inordinate length of time is required to wring the filter cake dry.

Methods have been proposed for removal of diacetylene from the gas stream, but these are cumbersome and expensive since they require additional process steps prior to the usual solvent purification operation which utilizes special equipment and significant quantities of special chemicals for treating purposes.

It is an object of the present invention, therefore, to provide a method whereby undesirable polymer growth in the solvent purification of acetylene is inhibited.

It is a further object of the invention to provide a method for stabilization of diacetylene against polymerization.

It is a still further object of the invention to provide novel stabilized compositions comprising diacetylene, a solvent therefor, and an added polymerization inhibitor which do not polymerize when subjected to conditions under which such compositions lacking the inhibitor polymerize readily and rapidly.

Other objects and advantages of the invention will be apparent from the following description and the appended claims.

According to the invention, diacetylene contained in a solvent is stabilized against polymerization by the addition thereto of small quantities of 2-vinyl pyridine. The compositions comprising diacetylene, a solvent therefor, and a minor amount of 2-vinyl pyridine will not exhibit any significant polymer formation on storage or when subjected to the temperatures ordinarily encountered in solvent purification systems for acetylene purification.

The following examples illustrate the invention but are not to be construed as limiting it in any manner.

EXAMPLE 1

Diacetylene was generated by dropping 40% sodium hydroxide into a well-stirred solution of 1,4-dichlorobutyne in ethanol at a temperature of approximately 75° C. The product gas was passed through Dry Ice traps and then allowed to bubble through a fritted gas bubbler into technical-grade butyrolactone at room temperature to make a stock solution of 0.3 g. of diacetylene per milliliter of solution. In the polymerization tests, 20 ml. of a test mixture containing a known amount of the diacetylene stock solution, butyrolactone, water, and a weighed amount of the 2-vinyl pyridine inhibitor were introduced into a thick-walled test tube. The mixture was frozen and the end of the test tube was drawn off in a torch flame to make a sealed ampule. The sealed ampules were wrapped in bronze screen and placed in an oven maintained at 125° C. for 16 hours, after which they were removed and inspected for polymer content. Blanks were run in which only butyrolactone and mixtures of butyrolactone, water and diacetylene were present. Results of a series of such tests are presented in Table I. All proportions given are on a weight basis with the amounts of diacetylene and inhibitor being expressed as percent by weight of the total composition.

Table I

| Test No. | Test Mixture | Condition of Test Mixture |
|---|---|---|
| 1 | 1:1 BL¹–H₂O | Usual straw color; perfectly clear; Unchanged. |
| 2 | 1:1 BL¹–H₂O plus 1% 2-vinyl pyridine. | Clear, medium-amber colored solution; no visible solids. |
| 3 | 1:1 BL¹–H₂O plus 0.25% diacetylene. | Reddish brown suspension of polymer; fairly heavy ppt. of finely divided material. |
| 4 | Same as in Test No. 3 plus 0.01% 2-vinyl pyridine. | Dark, red-wine colored solution no visible ppt. |
| 5 | Same as in Test No. 3 plus 0.1% 2-vinyl pyridine. | Same as in Test No. 4 above except somewhat darker color. |
| 6 | Same as in Test No. 3 plus 1.0% 2-vinyl pyridine. | Same as in Test No. 4 above. |
| 7 | 1:1 BL¹–H₂O plus 0.5% diacetylene. | Heavy brown ppt. settled in bottom of tube; liquid also full of suspended polymer. |
| 8 | Same as in Test No. 7 plus 0.01% 2-vinyl pyridine. | Dark, murky, brownish-red wine solution; no visible ppt. but a small dark ring on wall at liquid-vapor interface. |
| 9 | Same as in Test No. 7 plus 0.1% 2-vinyl pyridine. | Clear, deep red wine solution; no visible solids. |
| 10 | Same as in Test No. 7 plus 0.5% 2-vinyl pyridine. | Same as in Test No. 9 above. |

¹ Butyrolactone.

EXAMPLE 2

A series of polymerization tests were conducted in the same manner as those in Example 1 except that acetylene solvents other than butyrolactone were employed. In each series, the stock solution of diacetylene was made up by bubbling the diacetylene into the solvent being used as the testing medium or environment. For each series, blanks were run consisting of solvent-water mixtures, solvent-water-diacetylene mixtures, and solvent-water-inhibitor mixtures. Results of these tests are presented in Table II.

Table II

| Test No. | Test Mixture | Condition of Test Mixture |
|---|---|---|
| A-I | 1:1 DMF¹-H₂O | Clear, water-white solution. |
| A-II | 1:1 DMF¹-H₂O plus 0.25% diacetylene. | Clear yellowish supernatant liquid, extremely heavy brown coagulated precipitate. |
| A-1 | 1:1 DMF¹-H₂O plus 0.5% 2-vinyl pyridine. | Clear, light yellow solution. |
| A-2 | Same as A-II above plus 0.01% 2-vinyl pyridine. | Fairly clear, yellow-brown supernatant liquid; medium amount brown coagulated ppt.; light film on the walls. |
| A-3 | Same as A-II above plus 0.1% 2-vinyl pyridine. | Fairly heavy dark brown suspension; small amount finely divided ppt.; heavy film on liquid surface. |
| A-4 | Same as A-II above plus 0.5% 2-vinyl pyridine. | Clear amber solution, no visible ppt.; slight film on liquid surface. |
| C-I | 1:1 Acetonyl acetone-H₂O. | Clear, medium-yellow solution. |
| C-II | 1:1 Acetonyl acetone-H₂O plus 0.25% diacetylene. | Light brown suspension; finely-divided brown precipitate. |
| C-1 | 1:1 Acetonyl acetone-H₂O plus 0.5% 2-vinyl pyridine. | Clear, pale amber solution; no precipitate. |
| C-2 | Same as C-II above plus 0.01% 2-vinyl pyridine. | Clear, medium amber solution; no precipitate. |
| C-3 | Same as C-II above plus 0.1% 2-vinyl pyridine. | Same as C-2 above. |
| C-4 | Same as C-II above plus 0.5% 2-vinyl pyridine. | Same as C-3 above except dark amber in color. |
| D-I | 1:1 1,4-Dioxane-H₂O. | Perfectly clear, water-white solution. |
| D-II | 1:1 Dioxane-H₂O plus 0.25% diacetylene. | Extremely heavy, coagulated red-brown precipitate; clear amber supernatant liquid. |
| D-1 | 1:1 Dioxane-H₂O plus 0.5% 2-vinyl pyridine. | Clear yellow solution. |
| D-2 | Same as D-II above plus 0.01% 2-vinyl pyridine. | Brown suspension with very small amount of actual precipitate; trace of flaky brown ppt. on surface of liquid. |
| D-3 | Same as D-II above plus 0.1% 2-vinyl pyridine. | Medium-dark, red-wine solution; no visible precipitate. |
| D-4 | Same as D-II above plus 0.5% 2-vinyl pyridine. | Same as D-3 above. |

¹ Dimethylformamide.

From the results of these qualitative tests, it will be seen that inhibition of polymerization of diacetylene can be effected with as little as 0.01% of 2-vinyl pyridine. While the preceding examples have illustrated specific embodiments of the invention, substantial variation may be made without departing from the scope thereof. For example, the quantity of 2-vinyl pyridine used to inhibit the polymerization of diacetylene can be varied widely, the amount used being determined upon the basis of the amount of diacetylene present and the degree of inhibition desired. In general, only minor quantities of inhibitor are required. Concentrations of 2-vinyl pyridine in the range of about 0.01% to about 5% by weight of the total composition containing diacetylene are suitable, with concentrations from about 0.1% to about 1% being preferred. The stabilizing agent may, of course, be employed in as great a concentration as desired.

The inhibitor of the invention is not restricted to use with the solvents as set out in the examples above. 2-vinyl pyridine may be used to inhibit the polymerization of diacetylene in other like organic solvents commonly employed in the purification of acetylene by absorption techniques. In solvent systems where such solvents are used to absorb acetylene from a gas stream containing it in combination with other gases including diacetylene, polymerization of the diacetylene is effectively inhibited by the presence of a minor amount of 2-vinyl pyridine. To inhibit polymer formation during the absorption-stripping operation, the inhibitor can be added directly to the solvent feed stream, or it may be introduced as a solution of the desired concentration at some point in the absorption system. The inhibiting power of the 2-vinyl pyridine is not affected by continual reuse; hence, recirculation of the solvent provides as effective inhibition as the introduction of the fresh solution.

The inhibitor of the invention may also be utilized for preparing stabilized compositions of diacetylene in a solvent which can be safely stored over a period of time without undergoing polymerization with its usual attendant hazards.

This application is a continuation-in-part of my copending application Serial No. 391,747, filed November 12, 1953, now abandoned.

What is claimed is:

1. A composition of matter consisting essentially of diacetylene, a solvent therefor chosen from the group consisting of butyrolactone, dimethylformamide, acetonyl acetone, and 1,4-dioxane, and 2-vinyl pyridine, said composition containing diacetylene in concentrations up to about 0.5% by weight and 2-vinyl pyridine in an amount from about 0.01% to about 5% by weight of the total composition.

2. A composition of matter consisting essentially of diacetylene, a solvent therefor chosen from the group consisting of butyrolactone, dimethylformamide, acetonyl acetone and 1,4-dioxane, and 2-vinyl pyridine, said composition containing diacetylene in concentrations up to about 0.5% by weight and 2-vinyl pyridine in an amount from about 0.1% to about 1% by weight of the total composition.

3. A composition of matter consisting essentially of diacetylene, butyrolactone, and 2-vinyl pyridine, said composition containing diacetylene in concentrations up to about 0.5% by weight and 2-vinyl pyridine in an amount from about 0.01% to about 5% by weight of the total composition.

4. A composition of matter consisting essentially of diacetylene, butyrolactone, and 2-vinyl pyridine, said composition containing diacetylene in concentrations up to about 0.5% by weight and 2-vinyl pyridine in an amount from about 0.1% to about 1% by weight of the total composition.

5. A composition of matter consisting essentially of diacetylene, dimethylformamide, and 2-vinyl pyridine, said composition containing diacetylene in concentrations up to about 0.5% by weight and 2-vinyl pyridine in an amount from about 0.1% to about 1% by weight of the total composition.

6. A composition of matter consisting essentially of diacetylene, acetonyl acetone, and 2-vinyl pyridine, said composition containing diacetylene in concentrations up to about 0.5% by weight and 2-vinyl pyridine in an amount from about 0.01% to about 5% by weight of the total composition.

7. A composition of matter consisting essentially of diacetylene, acetonyl acetone, and 2-vinyl pyridine, said composition containing diacetylene in concentrations up to about 0.5% by weight and 2-vinyl pyridine in an amount from about 0.1% to about 1% by weight of the total composition.

8. A composition of matter consisting essentially of diacetylene, 1,4-dioxane, and 2-vinyl pyridine, said composition containing diacetylene in concentrations up to about 0.5% by weight and 2-vinyl pyridine in an amount from about 0.1% to about 1% by weight of the total composition.

References Cited in the file of this patent

UNITED STATES PATENTS 2,601,673 McMillan et al. _____ June 24, 1952